(12) United States Patent
Hoefer et al.

(10) Patent No.: US 7,760,471 B2
(45) Date of Patent: Jul. 20, 2010

(54) SERVO TRACK WRITER ARM POSITIONING DEVICE

(75) Inventors: Volker Hoefer, Traunreut (DE); Gerhard Scheglmann, Ruhpolding (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 493 days.

(21) Appl. No.: 11/581,087

(22) Filed: Oct. 13, 2006

(65) Prior Publication Data

US 2007/0137373 A1    Jun. 21, 2007

(30) Foreign Application Priority Data

Dec. 2, 2005    (DE)  ................ 10 2005 057 865

(51) Int. Cl.
*G11B 5/48*    (2006.01)
(52) U.S. Cl. .................. 360/264.3; 360/245.9
(58) Field of Classification Search ........... 360/264.3, 360/264.2, 281, 291.4, 245.8, 84, 245.9
See application file for complete search history.

(56) References Cited

U.S. PATENT DOCUMENTS

| | | | |
|---|---|---|---|
| 4,398,167 A | | 8/1983 | Dickie et al. |
| 4,795,925 A | | 1/1989 | Mihara et al. |
| 4,945,437 A | * | 7/1990 | Oguchi et al. ............ 360/261 |
| 5,986,854 A | * | 11/1999 | Vollmann .............. 360/251.1 |
| 6,155,106 A | * | 12/2000 | Sano .................. 73/117.02 |
| 6,271,515 B1 | * | 8/2001 | Matsumoto ............. 250/239 |
| 6,541,962 B1 | * | 4/2003 | Borgmann et al. ...... 324/207.17 |
| 6,885,457 B1 | | 4/2005 | Michel et al. |
| 7,493,984 B2 | * | 2/2009 | Ono et al. ............. 180/404 |
| 2004/0182637 A1 | * | 9/2004 | Yamamori et al. ........ 180/421 |
| 2005/0286172 A1 | | 12/2005 | Scheglmann et al. |
| 2006/0048995 A1 | * | 3/2006 | Kanayama et al. ....... 180/443 |

FOREIGN PATENT DOCUMENTS

| | | |
|---|---|---|
| DE | 100 46 552 | 4/2002 |
| DE | 10 2004 030 500 | 1/2006 |
| EP | 0 031 876 | 7/1981 |
| EP | 0 384 495 | 8/1990 |
| EP | 0 978 708 | 2/2000 |
| JP | 58 190219 | 11/1983 |

OTHER PUBLICATIONS

Search Report, European Application No. EP 06 02 3287, dated Mar. 15, 2007 (translated).

* cited by examiner

*Primary Examiner*—Jefferson Evans
(74) *Attorney, Agent, or Firm*—Kenyon & Kenyon LLP

(57) ABSTRACT

A positioning device includes a housing and a shaft that is able to be swiveled about a centrical position relative to the housing, at whose one end an element that is to be positioned is attachable. Furthermore, the positioning device has a swivel drive and a position measuring device. A cable, for the electrical connection of swivelable parts in the positioning device to a stationary unit, has a spiral-shaped course leading radially outwardly, starting from the shaft that is located in the centrical position.

8 Claims, 2 Drawing Sheets

SERVO TRACK WRITER ARM POSITIONING DEVICE

CROSS-REFERENCE TO RELATED APPLICATIONS

This application claims priority to Application No. 10 2005 057 865.9, filed in the Federal Republic of Germany on Dec. 2, 2005, which is expressly incorporated herein in its entirety by reference thereto.

FIELD OF THE INVENTION

The present invention relates to a positioning device, which may be suitable, e.g., for the precise movement of a swivel arm for a servo track writer.

BACKGROUND INFORMATION

Positioning devices of this type are often used in servo track writers (STW), where the tracks for magnetizable hard disks are formatted or written. For this purpose, a positioning device in the STW swivels a shaft, to which a swivel arm is attached. At its end, a write head is provided which is ultimately moved by the swivel motion of the shaft and is positioned in a highly precise manner, so that as many tracks as possible per unit surface area of the hard disk can be configured. The number of tracks formatted per surface area unit or diameter unit (tracks per inch) is a measure of the storage capacity of hard disks. For this reason, efforts are constantly undertaken to achieve a track allocation that is as tight as possible. For a hard disk manufacturer to be able to provide hard disks with a dense track allocation in an economical manner, it must be possible to position the swivel arm of the STW in an exact manner within a very short time (seek and settle time).

German Published Patent Application No. 10 2004 030 500 describes a positioning device, which has a swivel motor in the form of a so-called voice coil motor, whose primary part is formed as a rotor that is able to swivel opposite fixed permanent magnets. To activate the swivel motor, the rotor has to be supplied with electric current. For this purpose, a cable is usually provided for the electrical connection of the rotor to a stationary unit. Such a cable may interfere in a very short time with the operational behavior, especially with the exact positioning of the swivel arm of the STW.

SUMMARY

Example embodiments of the present invention provide a positioning device which makes possible an improvement of the positioning accuracy compared to conventional units, as well as an abbreviation of the seek and settle times, e.g., even when the shaft of the positioning device has a cable connection that is directed radially outwardly.

According an example embodiment of the present invention, a positioning device includes a housing and a shaft pivotable relative to the housing about a center position, at whose one end an element is able to be attached that is to be positioned. Moreover, the positioning device has a pivot drive that includes a stator and a rotor, the rotor being movable relative to the stator. In order to measure the swiveling angle of the shaft, the positioning device further has a position measuring device including two parts that are movable relative to each other. The rotor of the swivel drive and a first part of the position measuring device are connected rotatably fixed to the shaft. A cable for the electrical connection of the shaft, the rotor or the first part of the position measuring device to a stationary unit is, in addition, a component of the positioning device. Starting from the shaft located in the centrical position, the cable has at least in one partial section a spiral-shaped course that leads radially outwardly.

The positioning device may provide that it makes possible a technically simple and economically favorable design and an exceedingly accurate and rapid positioning, even if the shaft of the positioning device has a cable connection directed radially outwardly. This is the case, for example, if an electrical coupling, for example, a socket, of the STW has to be provided laterally at the housing. The dynamic performance of the positioning device may be improved, so that the positioning is optimized thereby. This is because forces that are created by the deformation or rather bending of the cable may be harmful for the performance behavior of the positioning device.

The overall behavior of the positioning device with regard to positioning accuracy and seek and settle time may be improved to an extraordinary degree if the positioning device arranged as described herein.

The cable is used, as was mentioned before, for the electrical connection of the shaft, the rotor or the first part of the position measuring device to a stationary unit. The stationary unit may be, for example, a control device or a regulating device, which outputs a regulated current and/or has a connection for ground potential. The electrical connection of the shaft may provide, for example, the grounding of the shaft. Alternatively or in supplement, the rotor may be connected electrically to a stationary unit for current supply. Provided the swivelable first part of the position measuring device requires an electrical connection, it may be connected to a stationary unit via the cable. This is the case, for example, if the swivelable first part of the position measuring device is designed to be active, and has a light source, for example. In this instance, for example, the light source of the position measuring device is supplied with current from a stationary current source, so that the stationary unit would be considered as having a fixed current source.

The cable is also used for the electrical connection of the shaft (e.g., for grounding), and/or of the rotor and/or of the first part of the position measuring device to a stationary unit.

The term centrical position should be understood to mean an angular position of the shaft, from which the shaft is able to be swiveled in both rotary directions, e.g., both in the clockwise direction and the counterclockwise direction. As a result, the centrical position does not include the angular positions of the shaft at the edge of the swiveling range. A special case of the centrical position comes about if the shaft is exactly in its null position, so that the shaft is rotatable, starting from this angular position, by the same angular quantity in both the clockwise and the counterclockwise sense up to the maximum swivel angle, which is mostly limited by a mechanical stop.

The course of the cable is arranged such that the cable lies around the shaft at an angle of at least 180°, e.g., of at least 240°, and e.g., of at least 360°. In other words, the cable runs at least along one-half of a revolution or along one-half of a winding in spiral fashion about the shaft.

The course of the cable is arranged such that, if the shaft is in a centrical position, e.g., in the null position, it satisfies the following relationship:

$$r(\Theta) = Ra \cdot \sqrt{1 - \left(1 - \frac{Ri^2}{Ra^2}\right) \cdot \left(1 - \frac{\Theta}{\Theta_{max}}\right)^2}$$

In this context, $\Theta$ represents the polar coordinate direction of a radial line, starting from the pole of the spiral, Ra represents the radius at $\Theta_{max}$ and Ri represents the inside radius of the spiral at $\Theta=0$.

The shaft may be able to be freely swiveled about a swivel angle of at least ±25°, e.g., of at least ±45° around the centrical position. This means that the centrical position has a certain angular distance from the maximum swivel angle, for example, from the mechanical stop.

The housing of the position measuring device may have lateral faces and end faces, the end faces of the housing representing the spatial limitation of the positioning device in the axial direction with respect to the shaft. The lateral faces, and in the case of a cylindrical arrangement of the housing there is only one of those, limit the positioning device appropriately in the radial direction. An electrical coupling may be arranged at one lateral face of the housing, for the electrical connection of the cable to the stationary unit.

The end of the shaft that is opposite to the end at which the element to be positioned is able to be attached, is frequently assigned an additional functionality. This may be, for example, that the respective end of the shaft cooperates with a mechanical stop. This boundary condition makes an axial cable loss from the shaft impossible, so that the cable follows a course leading radially outwardly.

The construction hereof may be of advantage, e.g., for positioning devices which are equipped with highly sensitive position measuring devices. Such position measuring devices are able to work with photoelectric scanning, e.g., according to an interference measuring principle.

According to an example embodiment of the present invention, a positioning device includes: a housing; a shaft swivelable about a centrical position relative to the housing, a first end of the shaft attachable to a component to be positioned; a swivel drive including a stator and a rotor, the rotor movable relative to the stator; and a position measurement device including two parts movable relative to each other. The rotor of the swivel drive and a first part of the position measurement device are connected to the shaft in a rotatably fixed manner, the positioning device including a cable adapted to electrically connect at least one of (a) the shaft, (b) the rotor and (c) the first part to a stationary unit, the cable having a spiral-shaped course leading radially outwardly starting from the shaft located in the centrical position.

The course of the cable may be arranged such that the cable is at an angle of one of (a) at least 180° and (b) at least 240° about the shaft.

The course of the cable may satisfy the relationship:

$$r(\Theta) = Ra \cdot \sqrt{1 - \left(1 - \frac{Ri^2}{Ra^2}\right) \cdot \left(1 - \frac{\Theta}{\Theta_{max}}\right)^2},$$

$\Theta$ representing a polar coordinate direction of a radial line, starting from a pole of the spiral, Ra representing a radius at $\Theta_{max}$, Ri representing an inside radius of the spiral.

The shaft may be swivelable about a swivel angle of one of (a) at least ±25° and (b) at least ±45° around the centrical position.

The positioning device may include an electrical coupling arranged at a lateral face of the housing.

A second end of the shaft opposite to the first end may penetrate the housing.

The cable may be arranged within the housing, and surfaces of the housing in contact with the cable may be at least one of (a) lined and (b) coated with a material that is low in friction and abrasion, e.g., a plastic material, PTFE, etc.

At least one surface area of the cable in contact with the housing may include a material that is low in friction and abrasion, e.g., a plastic material, PTFE, etc.

Further aspects and features of example embodiments of the present invention are described in more detail below with reference to the appended Figures.

DETAILED DESCRIPTION

Figure 1:
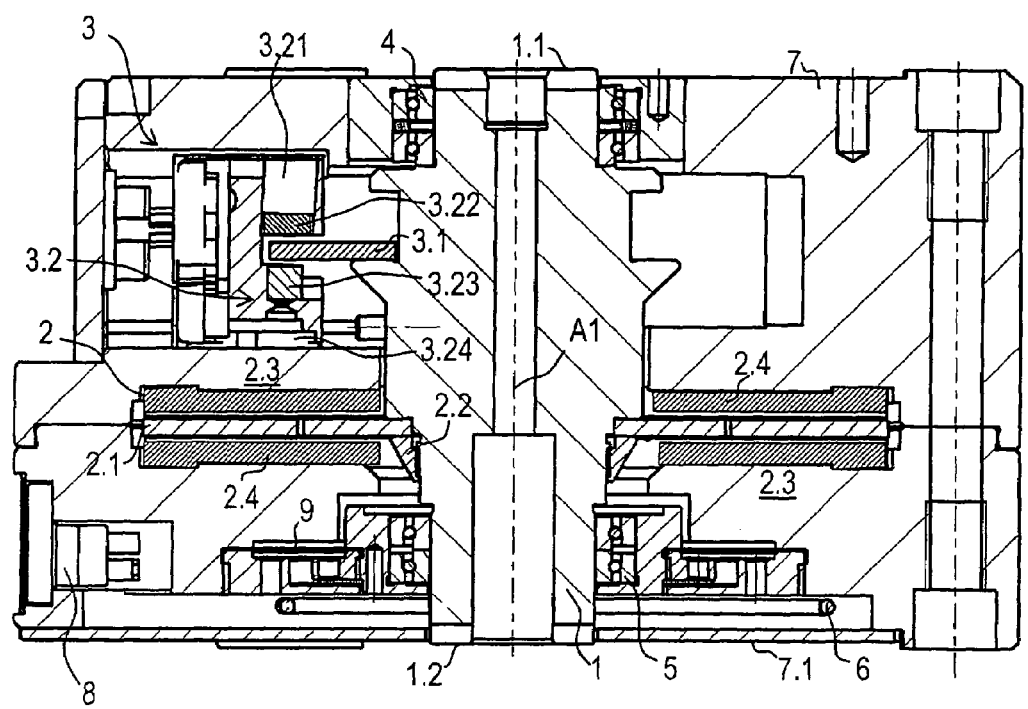
FIG. 1 is a cross-sectional view through a positioning device according to an example embodiment of the present invention.

FIG. 1 illustrates a positioning device as it is used in connection with STW. As illustrated in FIG. 1, a shaft 1 is able to swivel about an axis A1 and has a shaft end 1.1, to which a swivel arm for writing to a hard disk may be attached. As illustrated, housing 7 is arranged as a substantially cylindrical component. According to this, housing 7 has a lateral side which limits the positioning device spatially in a radial manner. In addition, two end faces of the housing border the positioning device in its axial extension. At the lower end face, a detachable housing cover 7.1 is arranged. An electrical coupling 8, e.g., a socket for accommodating a plug connector, is arranged counter to this at the lateral side of housing 7.

Within housing 7, at shaft 1, there are two roller bearing units 4, 5, which each include two ball bearings 4.1, 4.2, 5.1, 5.2. Roller bearing unit 5 is mounted such that it serves as a fixed bearing, e.g., it is arranged as an axially rigid support location. Roller bearing unit 4 is provided by an axially movable annular diaphragm 9, as a floating bearing, annular diaphragm 9 being exceedingly torsionally stiff in the torsion direction or the circumferential direction.

The swivel motion (e.g., a swivel range of ±60° about the null position is possible) is initiated by a so-called voice coil motor 2, an electrical direct drive. The primary part of voice coil motor 2, which works as a rotor within the swivel range, includes a printed circuit board 2.1 which includes as windings correspondingly running printed circuit boards. The windings 1 are arranged such that they are parallel to the drawing plane in FIG. 1. The secondary part, the stator of voice coil motor 2, is formed by permanent magnets 2.4, which are arranged across from the rotor, separated by an air gap.

In the operation of voice coil motor 2, permanent magnets 2.4 remain stationary, while printed circuit board 2.1 performs a swivel motion along the partial circle. Printed circuit board 2.1 is connected rotatably fixed to shaft 1 by a tightening nut 2.2. In this manner, the torque of voice coil motor 2 is initiated in shaft 1, for the swivel motion. Printed circuit board 2.1 and tightening nut 2.2 may thus be assigned to the primary part or to the rotor of voice coil motor 2.

The secondary part includes permanent magnets 2.4, which are fastened on magnetic supports 2.3 made of ferromagnetic material along the partial circle line. In the operation of the positioning device, the secondary part acts like a torque support and does not take part in the swivel motion of shaft 1, and may therefore also be designated as a stator. Voice coil motor 2 thus works according to the principle of a synchronous direct drive.

The actual swivel angle of shaft 1 is measured by a position measuring device 3, which works according to a similar operating principle as described, e.g., European Published Patent Application No. 0 978 708. According to this, position measuring device 3 includes a transparent phase grating 3.1, which has the shape of a segment of a ring disk so that the entire swivel range may be scanned. In this context, transparent phase grating 3.1 is connected to shaft 1 in a rotatably fixed manner, so that it takes part in the swivel movements of shaft 1.

Opposite to this is a non-rotatable scanning unit 3.2 of position measuring device 3. Scanning unit 3.2 includes a light source 3.21, arranged as an LED, for example, a condenser lens 3.22 and a graduated segment 3.23, as well as photodetectors 4.24 for receiving the modulated light beams. Graduated segment 3.23 has structures on both sides (in FIG. 1 the upper and the lower side) which act as phase gratings. Since scale segment 3.23 does not take part in the swivel movement and is therefore always opposite to light source 3.21, it may be arranged to be small in comparison with swiveling phase grating 3.1.

In the operation of the positioning device, the light generated by light source 3.21 arranged as an LED first passes through condenser lens 3.22 and subsequently through transparent phase grating 3.1, which generates diffracted beam portions and causes a phase change of the light waves. The light rays changed in this manner reach the first surface of scale segment 3.23, which is arranged as a phase grating. There, they are again diffracted, and a further phase change of the light waves occurs. The diffracted light rays then pass through the second surface, which is used as a further phase grating. The beam of rays thus modulated then impinges on photodetectors 3.24. Photodetectors 3.24 convert the light signals into electrical signals, which are then suitably processed further to obtain the location information. The use of the comparatively small scale segment 3.23 as a non-rotating component may provide that the tolerances with respect to the wobble or axial run-out of scale segment 3.23 do not have to be selected to be excessively tight.

In an alternative example embodiment of position measuring device 3, scanning unit 3.2 includes a so-called VCSEL (Vertical Cavity Surface Emitting Laser) as a light source 3.21. A beam of rays, which spreads out along the direction of an optical axis, is emitted by this light source 3.21. The emitted light bundle is substantially a TEM 00 mode of a Gaussian beam, which is emitted by the utilized VCSEL. Because of the VCSEL radiation characteristic, the emitted beam of rays has a certain divergence and is transformed by condenser lens 3.22. The beam transformation of the emitted, divergent bundle of rays may take place such that, after condenser lens 3.22, an approximately collimated bundle of rays is present, which has a beam throat at a certain distance from condenser lens 3.22. In this context, beam throat should be understood as the location in the beam cross section along the direction of beam propagation, at which location the bundle of rays has its minimum surface area or lateral extension. Positioned in the region of the beam throat is phase grating 3.1, upon which the transformed bundle of rays impinges. The positioning of phase grating 3.1 at this location may provide that the build-on tolerance is thereby increased in both the radial and tangential direction and in the direction of beam propagation, i.e., in the axial direction. For a high build-on tolerance in this direction, one should generally strive for illuminating phase grating 3.1 with the aid of a bundle of rays of low divergence and a small beam diameter. Since these quantities may not be arbitrarily minimized in the case of a predefined wavelength, a compromise must be found for the optimum positioning of phase grating 3.1. Such a compromise is obtained by positioning phase grating 3.1 in the beam throat of the emitted or transformed bundle of rays, where the product of the divergence and the beam diameter of the TEM 00 mode of a Gaussian beam is at a minimum. Phase grating 3.1 splits the incident bundle of rays into first and second partial bundles of rays, which spread out away from the optical axis. As already described above, the bundles of rays changed in this manner also impinge on photodetectors 3.24. Photodetectors 3.24 convert the light signals into position-dependent, electrical signals.

Especially in the use of such a high-resolution interferential position measuring device 3, an optimization of the mechanically acting components may be particularly advantageous for achieving the greatest possible increase in precision and speed of the positioning device as a whole.

As illustrated in FIG. 1, there is a cable 6 in an opening of housing 7, the opening being closed by housing cover 7.1. Cable 6 is used for electrically connecting shaft 1 and rotor 2.1 to a stationary unit via electrical coupling 8.

The stationary unit may be a regulating device whose output cable is able to be plugged into electrical coupling 8 which is electrically connected to cable 6. The regulated current is then introduced into the windings of printed circuit board 2.1 via cable 6, for moving voice coil motor 2. For this purpose, two stranded conductors, which are components of cable 6, are required. An additional stranded conductor is used for grounding the shaft. This stranded conductor is also contacted to electrical coupling 8. After connection to the stationary unit has taken place, e.g., the regulator device, ground potential is then present at shaft 1. Correspondingly, cable 6 includes three stranded conductors, which each have, e.g., 128 strands, having a diameter in each case of, e.g., 50 µm. Because of this arrangement, the result is being able to achieve an exceedingly elastic cable 6, which is, moreover, suitable for undergoing a large number of bending procedures.

Figure 2:
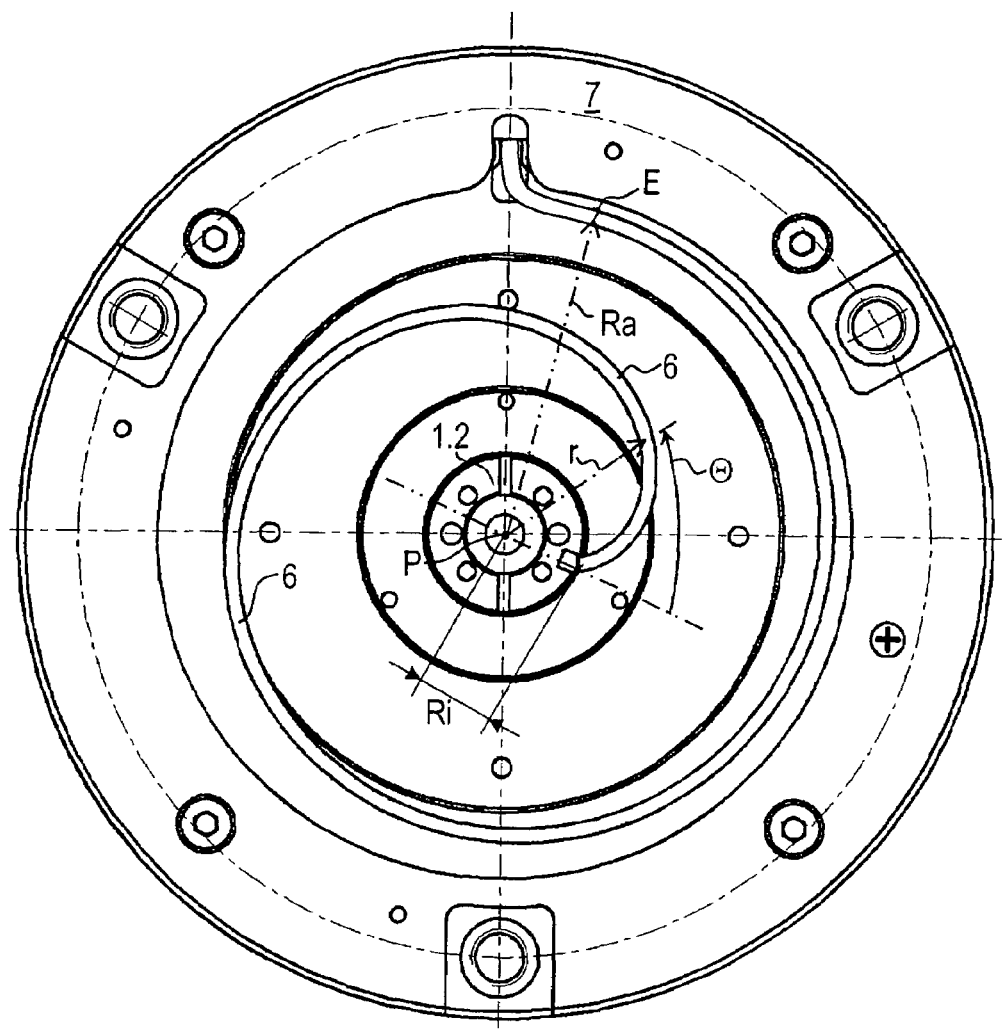
FIG. 2 is a bottom view of the positioning device with a housing cover open.

FIG. 2 is a view of the positioning device from below, having housing cover 7.1 removed. In FIG. 2, shaft 1 is in a centrical position, and shaft 1 is particularly located in its null position, and thus is able to be swiveled, starting from this position, about the same angle quantity (e.g., 60° in each case) in the clockwise direction and in the counterclockwise direction. Cable 6 is fastened on shaft 1 at a prespecified exit angle, and, starting from shaft 1, has a spiral-shaped course leading radially outwardly. Moreover, cable 6 is fastened at a predetermined angle at an end point E to housing 7, e.g., adhered or bonded. Between the exit from shaft 1 and end point E, cable 6 is able to move relative to housing 7. Considered geometrically, cable 6 forms a spiral about a pole P, conditioned upon the starting point and end point E, as well as the appertaining angular alignments of cable 6 at these points. The course of this spiral may be simply described in a polar coordinate system, in which the coordinate origin lies in pole P of the spiral, and the respective polar coordinate direction is fixed by $\Theta$. Accordingly, $\Theta$ represents the angle of a radial line beginning at the coordinate origin (pole P, e.g.) relative to the initial polar coordinate direction ($\Theta=0$). The spiral line, which reflects the course of cable 6, begins at $\Theta=0$ and $r(\Theta=0)=Ri$, where Ri corresponds to one-half the diameter of shaft 1 at the appropriate location. In the exemplary embodiment illustrated, the polar coordinate direction extends up to an angle $\Theta_{max}$ of, e.g., approximately 460°, and that is where end point E is, i.e., at a distance Ra, starting from pole P. Expressed mathematically, the course of cable 6 satisfies the following relationship:

$$r(\Theta) = Ra \cdot \sqrt{1 - \left(1 - \frac{Ri^2}{Ra^2}\right) \cdot \left(1 - \frac{\Theta}{\Theta_{max}}\right)^2}$$

In order to reduce frictional forces and in order to minimize abrasion phenomena, the surface of housing 7 as well as the surface of housing cover 7.1, which come into contact with cable 6, are able to be lined or coated using an appropriately suitable material, such as PTFE (polytetrafluoroethylene).

The use of PTFE at this place may also provide that the dynamic performance of the STW when starting up, that is when shaft 1 is standing, is particularly satisfactory, because PTFE has the property that the static friction is just as great as the dynamic friction, so that the transition from standstill to motion takes place without jolting.

Alternatively or in supplement, cable 6 may, at least in a surface area that is able to come into contact with housing 7 and appertaining housing cover 7.1, have material that is low in friction and abrasion. For example, cable 6 may be enclosed by suitable rings, such as PTFE rings, at certain intervals, so that the surfaces of the rings that are low in friction and abrasion touch housing 7 and housing cover 7.1.

Because cable 6, starting from shaft 1 located in a centrical position, has a spiral-shaped course leading radially outwardly, the operating behavior of the positioning device is not noticeably influenced by forces introduced into cable 6, since these forces are significantly reduced. Because of the improved course of cable 6, spring forces of the cable interfere just as little in the performance of the positioning device or in its dynamic performance.

For further improvement, cable 6 may be subdivided into a plurality of individual cables, which run in a possibly even number of spirals that extend in a contrary sense or mirrored to one another. In this manner, spring forces of the individual cables would mostly cancel out one another, so that interfering forces are reduced to a minimum.

What is claimed is:

1. A positioning device, comprising:
   a housing;
   a shaft swivelable about a centrical position relative to the housing, a first end of the shaft attachable to a component to be positioned;
   a swivel drive, arranged as an electrical direct drive, including a stator and a rotor, the rotor movable relative to the stator; and
   a position measurement device including two parts movable relative to each other;
   wherein the rotor of the swivel drive and a first part of the position measurement device are connected to the shaft in a rotatably fixed manner, the positioning device including a cable adapted to electrically connect at least one of (a) the shaft, (b) the rotor and (c) the first part to a stationary unit, the cable having a spiral-shaped course leading radially outwardly starting from the shaft located in the centrical position;
   wherein the cable is arranged within the housing; and
   wherein surfaces of the housing in contact with the cable are at least one of (a) lined and (b) coated with a material that is low in friction and abrasion, the material including at least one of (a) a plastic material and (b) PTFE.

2. The positioning device according to claim 1, wherein the course of the cable is arranged such that the cable is at an angle of one of (a) at least 180° and (b) at least 240° about the shaft.

3. The positioning device according to claim 1, wherein the course of the cable satisfies the relationship:

$$r(\Theta) = Ra \cdot \sqrt{1 - \left(1 - \frac{Ri^2}{Ra^2}\right) \cdot \left(1 - \frac{\Theta}{\Theta_{max}}\right)^2},$$

$\Theta$ representing a polar coordinate direction of a radial line, starting from a pole of the spiral, Ra representing a radius at $\Theta_{max}$, Ri representing an inside radius of the spiral.

4. The positioning device according to claim 1, wherein the shaft is swivelable about a swivel angle of one of (a) at least ±25° and (b) at least ±45° around the centrical position.

5. The positioning device according to claim 1, further comprising an electrical coupling arranged at a lateral face of the housing.

6. The positioning device according to claim 1, wherein a second end of the shaft opposite to the first end penetrates the housing.

7. The positioning device according to claim 1, wherein at least one surface area of the cable in contact with the housing includes a material that is low in friction and abrasion.

8. The positioning device according to claim 7, wherein the material includes at least one of (a) a plastic material and (b) PTFE.

* * * * *